3,597,166
AMMONIA BURNER FLOW DISTRIBUTOR
Jack M. Hochman, Boonton, N.J., assignor to Esso
Research and Engineering Company
Filed Dec. 18, 1968, Ser. No. 784,846
Int. Cl. B01j 9/04; C01b 21/28
U.S. Cl. 23—288                                    4 Claims

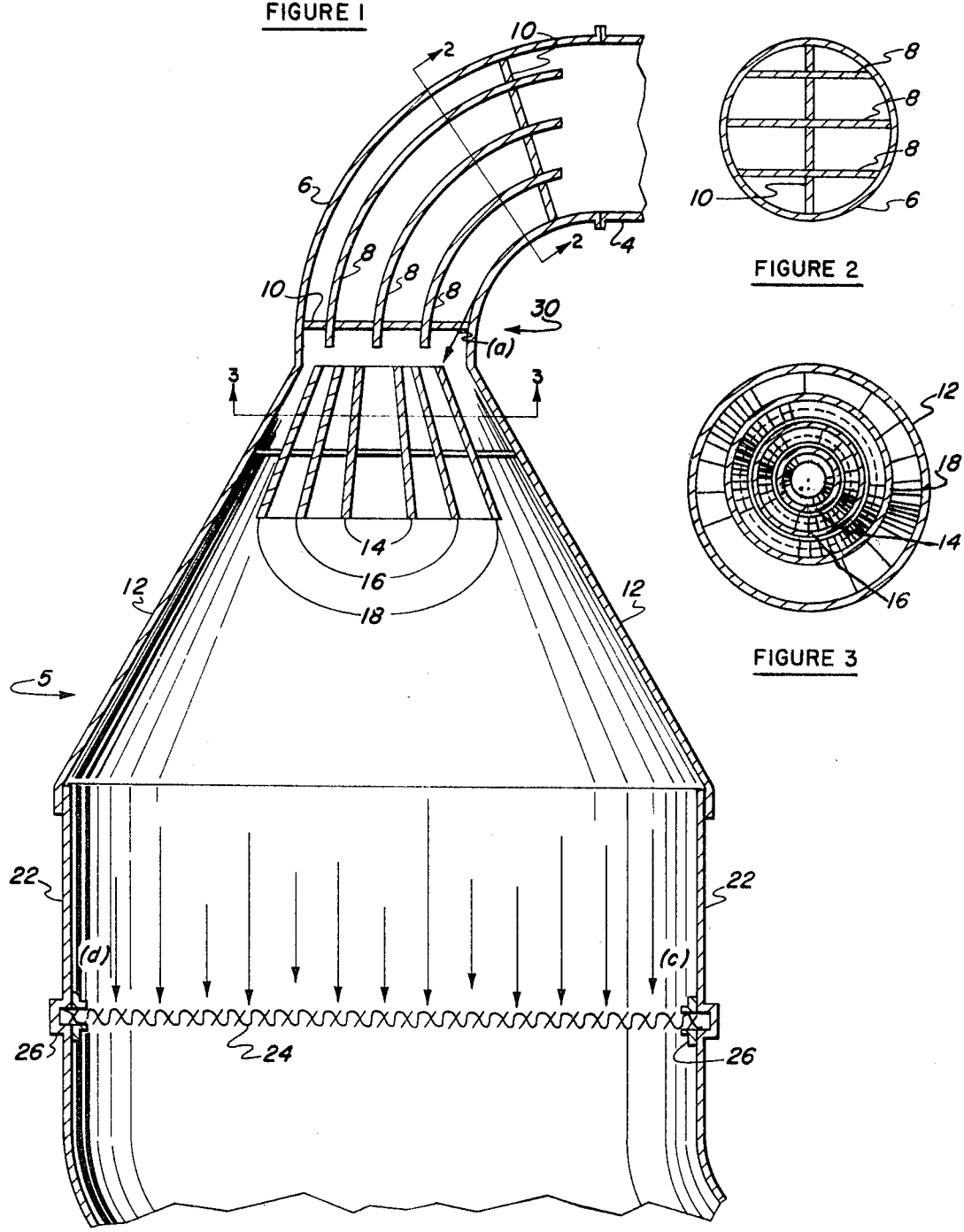
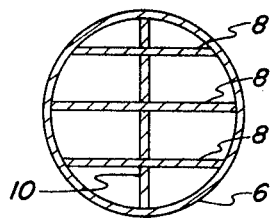
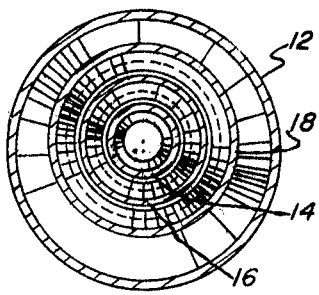

ABSTRACT OF THE DISCLOSURE

Uniform flow to an ammonia burner gauze catalyst is achieved by providing a series of turning vanes and a series of truncated cone guide vanes in communication with the turning vanes. The guide vanes are designed such that the length to diameter ratio of the vanes is small enough so that flow separation is minimized. To alleviate the effects of any small amount of flow separation which may occur in the turning vanes, and guide vanes are positioned so that they are slightly off-center with respect to the turning vanes. The use of the device of the instant invention leads to improved overall ammonia burner efficiency and to the substantial reduction of undesirable side reactions.

BACKGROUND OF THE INVENTION

This invention relates to means and methods for obtaining uniform flow of a fluid after the fluid has passed through a particular flow-disturbing geometric configuration.

More particularly, the invention relates to means for achieving uniformity in flow after a fluid has passed through a close radius elbow and expansion section.

Most particularly, the invention is directed to means for achieving uniform flow in an ammonia burner used in a process where the ammonia is to be ultimately converted to nitric acid. In such burners it frequently occurs that a fluid inlet stream enters the chamber where burning is to occur through a relatively small diameter opening and is thereafter directed and expected to flow uniformly over a wider area, usually the area of the interior of the chamber. In the present invention a new and improved inlet flow distributor is disclosed which is particularly useful in preventing flow maldistribution and producing a uniform velocity profile in such burners.

The ammonia conversion process, which involves the oxidation of ammonia over a suitable catalytic gauze such as a platinum gauze, proceeds at extremely rapid rates. Undesirable side reactions can occur, which reactions lower the efficiency of the process by converting the ammonia directly to nitrogen. These side reactions depend on the reaction temperature, feed composition, contacting time and catalyst condition. Feed composition, reaction temperature and catalyst condition are amenable to adequate control and, hence, the undesirable side reactions are primarily effected by flow maldistribution to and through the gauze catalyst. Nonuniform flow results in too short a contact time for some of the fluid, too high a temperature for some of the fluid, and localized high gauze temperatures resulting in excessive loss of the platinum comprising the gauze. All of these factors serve to reduce conversion from desired levels which range in the vicinity of 97% and higher. In addition, there is also a significant additional debit due to increased platinum catalyst loss. The side reactions referred to above include the following:

(1) $2NH_3 \rightarrow N_2 + 3H_2$
(2) $4NH_3 + 3O_2 \rightarrow 2N_2 + 6H_2O + 302$ Kcal
(3) $4NH_3 + 6No \rightarrow 5N_2 + 6H_2O + 432$ Kcal Reaction (1) occurs with excess heating of the feed mixture. This may occur where the residence time in the gauze is too high for a portion of the feed due to the formation of eddy currents in a high temperature zone. Reaction (2) results where the platinum gauze temperature is too high, and this may occur in those areas of the gauze which are "feed starved" due to maldistribution. It will be appreciated that if certain areas of the gauze are not contacted with the incoming feed, they will have a tendency to heat up beyond the desired optimum temperature. The third reaction would occur if all the ammonia is not converted because of too short a contact time. It is, therefore, to be understood that this phenomenon is also to be avoided if one is to achieve optimum conversion.

From the above discussion, it is apparent that uniform flow distribution of the feed to and through the gauze must be assured in order to obtain optimum conversion efficiency. Various methods have been proposed to alleviate maldistributions of a flowing fluid. Thus, for example, eddy currents and other irregularities in flow distribution may be partially avoided by the elimination of elbows or by providing a sufficient length of straight pipe after any elbows present in the introduction section. Both of these alternatives, however, are not economically attractive in that up to about 30 to 40 pipe diameters of straight pipe length are required to completely alleviate the disturbing effect of any bend or elbow in the line. Since large diameter pipe is employed in a typical burner, this could result in 60 to 90 feet of overhead pipe. This, of course, is highly undesirable. In this vein, the introduction angle into the expansion section of the burner may be reduced to minimize undesirable flow patterns. Here again, however, the reduction is accompanied with greater overhead height requirements and, hence, is also undesirable. As an example of the increase in length required, it is to be noted that upon a reduction of the angle into the expansion chamber of from about 60° to about 7°, the overhead distance between the elbow and the expansion section would increase to about 30 feet for an expansion from 2 feet to 6 feet. It will be understood by those skilled in the art that it is far more desirable and economical to retain a short expansion section design.

Another prior art method for achieving uniform flow is the providing of a high resistance uniformly across the path of the incoming feed stream upstream of the gauze. The simplest method of doing this is by the use of the perforated distribution plate. The use of such perforated plates to alleviate flow maldistributions in the instant application is unsatisfactory for several reasons. These reasons include problems arising from the fact that the fluid jets emanating from the holes do not fully dissipate before hitting the gauze, thus causing local flow maldistribution in the gauze. While this problem may be eliminated by the appreciable dissipation of the jet by increasing the distance between the perforated plate and the gauze, this solution is not desirable in that it requires an increase in burner straightside and increased residence time at elevated temperatures. Another method of eliminating undesirable impingement of fluid jets on the gauze is by decreasing the size of the perforation. However, these are subject to plugging problems. The high resistance is also undesirable because of the increased pressure drop required to achieve uniform flow, whereas the turning vanes and cones described in the instant invention will actually have the additional benefit of decreasing pressure drop.

Accordingly, it is the principal object of the present invention to provide an improved and novel fluid inlet flow distributor which is effective to produce a uniform velocity gradient across a profile of substantially increased width in comparison to the inlet flow profile.

Another object of the invention is to provide an improved inlet flow distributor for use in a reactor vessel of the type employing a catalytic gauze over which ammonia may be burned.

Another object of the invention is to provide an improved inlet flow distributor having a wide range of performance.

These and other objects and advantages of the invention will become apparent and the invention will be more fully understood from the following detailed description taken in conjunction with the accompanying drawings in which:

FIG. 1 is a vertical cross-section of the improved inlet flow distributor of the instant invention.

FIG. 2 is a cross-sectional view of a portion of the inlet flow distributor of the invention taken along the line 2—2 of FIG. 1.

FIG. 3 is a cross-sectional view of another portion of the inlet flow distributor of the invention taken along the line 3—3 of FIG. 1.

Referring to the drawings in detail and particularly to FIG. 1, a fluid inlet line 4 is provided for feeding fluid to the interior of the burner indicated generally by the reference numeral 5. Burner 5 is provided with a conically shaped entrance portion 12 and a cylindrically shaped burner portion 22. A wire gauze 24 is maintained in burner section 22 by means of suitable flange elements indicated by the reference numeral 26. For the purposes of this disclosure, the gauze 24 is described as being a multilayer platinum gauze used to catalyze the burning of ammonia, which again for the purposes of this disclosure is the fluid to be burned. However, it should be appreciated that the specific fluid being introduced into the burner and the specific construction of the gauze 24 are unimportant with respect to the scope of the present invention. Obviously, any fluid may be introduced, and it should also be apparent that substitutions may be made for the gauze 24. Thus, a bed of solids such as catalyst in the form of pellets, spheres, or alternatively such materials as sorptive types of particles, such as silica gel, activated charcoal, molecular sieves and the like, may be substituted for gauze 24.

As hereinbefore indicated, it is highly desirable that an even velocity profile without maldistribution or stagnation points result when the fluid being processed contacts the gauze 24. As may be seen, the inlet pipe 4 is of a substantially smaller diameter than that of the gauze 24 and, hence, the fluid must be spread out in order to obtain the desired uniformity of flow. This spreading out or enlargement of the relatively high velocity fluid stream in inlet pipe 4 into a uniform velocity gradient across the greatly increased diameter of the gauze 24 is accomplished by the inlet flow distributor 30 of the invention.

Distributor 30 is comprised of a plurality of turning vanes 8 housed within the close radius elbow 6 which is connected to inlet pipe 4 and also is in communication with the conically shaped portion 12 of the burner 5. Suitable spiders 10 are provided to correctly position and maintain vanes 8 in spaced relationship within elbow 6. As may be seen in FIG. 2, the turning vanes are, in effect, flow splitters which extend across the elbow 6. While these turning vanes aid in achieving the desired uniformity of flow, they cannot produce optimum results in and of themselves. This is primarily because even if the flow were turned uniformly to make the 90° turn, there still would be the need for a device to spread the flow across the expanded section. Further, there is some flow separation in the elbows, particularly that which has the shortest turning radius. Thus, as indicated by the arrow (a), the feed flowing on the right-hand side of the elbow would have a tendency to leave the interior wall of the elbow in a tangential fashion. This, of course, would be detrimental to the stated objective of achieving uniform flow. For these reasons, a plurality of guide vanes 14, 16 and 18 are provided. These guide vanes are in the form of truncated cones and in a preferred embodiment are designed such that the total angle between adjacent surfaces of cones 14, 16 and 18 is in the range of from about 0 to about 15° and preferably about 7°. The $L/D$ ratio (length of guide vanes divided by the inlet diameter or equivalent annular spacing between vanes) is small enough so that no flow separation occurs as a result of the guide vanes. However, as hereinabove indicated, since there is some separation primarily in the section of the elbow having the shortest turning radius, the guide vanes, as may be seen in FIG. 3, are not centered with respect to the turning vanes 8. As illustrated in FIGS. 1 and 3, the cones 14, 16 and 18 are displaced somewhat to the left so that that portion of the gauze (indicated by the reference (c)) closest to the side of the elbow 6 having the shortest turning radius receives the same amount of flow as does portion (d) of the gauze.

The structural arrangement of the present invention is effective to accomplish a uniform velocity profile so that an exceptionally smooth and uniform flow pattern is provided across the entire width of gauze 24. The specific arrangement of turning vanes 8 and guide vanes 14, 16, and 18 is effective to produce a flow distributor which will result in exceptionally good distribution patterns over a wide range of inlet flow velocities. This is principally due to the fact that the turning vanes and guide vanes tend to direct the flow uniformly independent of the absolute velocity of the fluid.

It should be pointed out that the use of the guide vanes alone will not achieve desired results and, in fact, can cause even greater flow instability than if not present at all. For example, if guide vanes alone are used, this may result in flow separation in the channel between 16 and 18. This in turn will lead to an increase in resistance to flow offered by that channel. This immediately diverts more flow to the remaining channels. Thus, the instability will tend to grow, and it is even possible for backflow to develop in the separated channel.

While a specific embodiment of the invention has been shown and described in detail to illustrate the application of the inventive principles, it will be understood that the invention may be embodied otherwise without departing from these principles. While the invention has been described in the embodiment of an ammonia burner, it is useful in other environments as well. Thus, in determining the full scope of the invention, reference should be had to the following appended claims.

What is claimed is:

1. An improved ammonia burner comprising a cylindrical burner portion, a catalytic gauze disposed across said burner portion, a conical entrance portion funneling outwardly into said burner portion, an entrance elbow in communication with said entrance portion, said elbow having a diameter relatively smaller than the diameter of said burner portion, a plurality of turning vanes positioned within said elbow adapted to split the flow of ammonia entering said elbow and a plurality of concentric truncated cone-like guide vanes positioned between said elbow and said catalytic gauze adapted to receive and evenly distribute the ammonia flowing from said turning vanes, said guide vanes extending longitudinally in the direction of fluid flow between coplanar extremities and being eccentrically disposed relative to the central axis of said elbow on the side of said elbow having the greater fluid flow turning radius.

2. The distributor of claim 1 wherein the angle between adjacent surfaces of said guide vanes is in the range of from about 0° to about 15°.

3. The distributor of claim 1 wherein the angle between adjacent surfaces of said guide vanes is about 7°.

4. A fluid processing reactor comprising a cylindrical body portion, reactant means disposed across said body portion characterized by an inability to distribute said fluid uniformly, a conical entrance portion funneling outwardly into said body portion, an entrance elbow in communication with said entrance portion, said elbow having a diameter relatively smaller than the diameter of said body portion, a plurality of turning vanes positioned within said elbow adapted to split the flow of fluid entering said elbow and a plurality of concentric truncated cone-like guide vanes positioned between said elbow and said body portion adapted to receive and evenly distribute the fluid flowing from said turning vanes, said guide vanes extending longitudinally in the direction of fluid flow between coplanar extremities and being eccentrically disposed relative to the central axis of said elbow on the side of said elbow having the greater turning radius.

References Cited
UNITED STATES PATENTS

| | | | |
|---|---|---|---|
| 2,343,560 | 3/1944 | Klein et al. | 23—288X |
| 2,611,685 | 9/1952 | Yoder | 239—590.5X |
| 2,733,044 | 1/1956 | Danel | 239—590.5X |
| 2,782,107 | 2/1957 | Inman | 23—288 |
| 2,789,889 | 4/1957 | Bergstrom et al. | 23—288 |

JAMES H. TAYMAN, Jr., Primary Examiner

U.S. Cl. X.R.

23—162; 239—461, 500, 502, 590.5